US010683436B2

(12) United States Patent
Kim et al.

(10) Patent No.: US 10,683,436 B2
(45) Date of Patent: Jun. 16, 2020

(54) ONE-COMPONENT TYPE PAINT COMPOSITION WITH SUPERIOR SCRATCH RESISTANCE

(71) Applicant: KCC CORPORATION, Seoul (KR)

(72) Inventors: Chang Hyeok Kim, Gyeonggi-do (KR); Sung Hee Moon, Gyeonggi-do (KR); Jin Hoi Kim, Gyeonggi-do (KR); Myoung Gi Choi, Gyeonggi-do (KR); Yong Ho Choi, Gyeonggi-do (KR); Bon Yi Lee, Gyeonggi-do (KR)

(73) Assignee: KCC CORPORATION (KR)

( * ) Notice: Subject to any disclaimer, the term of this patent is extended or adjusted under 35 U.S.C. 154(b) by 84 days.

(21) Appl. No.: 16/066,515

(22) PCT Filed: Dec. 27, 2016

(86) PCT No.: PCT/KR2016/015336
§ 371 (c)(1),
(2) Date: Jun. 27, 2018

(87) PCT Pub. No.: WO2017/116118
PCT Pub. Date: Jul. 6, 2017

(65) Prior Publication Data
US 2019/0016921 A1 Jan. 17, 2019

(30) Foreign Application Priority Data

Dec. 28, 2015 (KR) .......... 10-2015-0187854
Dec. 28, 2015 (KR) .......... 10-2015-0187891

(51) Int. Cl.
C09D 7/40 (2018.01)
C08L 33/14 (2006.01)
C08F 220/20 (2006.01)
C08L 67/07 (2006.01)
C09D 201/02 (2006.01)
C09D 201/00 (2006.01)
C09D 201/06 (2006.01)
C08L 101/00 (2006.01)
C08G 63/685 (2006.01)

(52) U.S. Cl.
CPC ........ C09D 201/025 (2013.01); C08F 220/20 (2013.01); C08G 63/6854 (2013.01); C08L 33/14 (2013.01); C08L 101/005 (2013.01); C09D 7/40 (2018.01); C09D 201/00 (2013.01); C09D 201/005 (2013.01); C09D 201/02 (2013.01); C09D 201/06 (2013.01); C08L 67/07 (2013.01)

(58) Field of Classification Search
CPC .... C09D 201/025; C09D 7/40; C09D 201/00; C09D 201/005; C09D 201/02; C09D 201/06; C08F 220/20; C08G 63/6854; C08L 33/14; C08L 101/005; C08L 67/07
USPC .......................................... 524/513
See application file for complete search history.

(56) References Cited

U.S. PATENT DOCUMENTS

| 4,424,252 | A | 1/1984 | Nativi |
| 5,474,811 | A | 12/1995 | Rehfuss et al. |
| 5,552,497 | A | 9/1996 | Taylor et al. |
| 5,646,214 | A * | 7/1997 | Mayo ............. C09D 167/00 525/10 |
| 6,165,618 | A | 12/2000 | Ohrbom et al. |
| 6,228,953 | B1 | 5/2001 | Barancyk et al. |
| 6,646,049 | B2 | 11/2003 | Ramesh |
| 7,872,078 | B2 | 1/2011 | Foringer et al. |
| 2002/0026015 | A1 | 2/2002 | Ramesh |
| 2002/0119320 | A1 | 8/2002 | Ramesh et al. |
| 2003/0009052 | A1 | 1/2003 | Ramesh et al. |
| 2003/0181539 | A1 | 9/2003 | Baumgart et al. |
| 2008/0124532 | A1 | 5/2008 | Menovcik et al. |
| 2009/0062453 | A1 | 3/2009 | Foringer et al. |

FOREIGN PATENT DOCUMENTS

| CN | 1132231 A | 10/1996 |
| CN | 11324757 A | 10/1996 |
| CN | 101423595 A | 5/2009 |
| CN | 101821019 A | 9/2010 |
| EP | 0110540 A1 | 6/1984 |
| KR | 1019990062637 A | 7/1999 |
| KR | 1020120100988 A | 9/2012 |
| KR | 1020130078644 A | 7/2013 |
| KR | 1020150005828 A | 1/2015 |

OTHER PUBLICATIONS

PCT/KR2016/015336 International Search Report dated Mar. 28, 2017; 3 pgs.
EP16882070.2 Search Report dated Aug. 14, 2018; 7 pgs.
CN201680076872.3 1st Office Action dated Sep. 27, 2019, 6 pgs.
IN201817023585 1st Office Action dated Sep. 20, 2019, 5 pgs.

* cited by examiner

Primary Examiner — William K Cheung
(74) Attorney, Agent, or Firm — Bracewell LLP; Brad Y. Chin

(57) ABSTRACT

Embodiments relate to a one-component type paint composition with superior scratch resistance and secures excellent scratch restoring performance by including a resin, a curing agent, a curing catalyst and an organic solvent, whereby the resin includes: 30 to 70 wt % of a carbamate group-containing acrylic polyol resin; and 5 to 25 wt % of a hyperbranched structure carbamate group-containing polyester polyol resin, based on 100 wt % of the paint composition.

10 Claims, No Drawings

ONE-COMPONENT TYPE PAINT COMPOSITION WITH SUPERIOR SCRATCH RESISTANCE

CROSS REFERENCE TO RELATED APPLICATIONS

This application claims the benefit of and priority to PCT/KR2016/015336, filed on Dec. 27, 2016, entitled (translation), "ONE-COMPONENT TYPE PAINT COMPOSITION WITH SUPERIOR SCRATCH RESISTANCE," which claims the benefit of and priority to Korean Patent Application Nos. 10-2015-0187891 and 10-2015-0187854, both of which were filed on Dec. 28, 2015, each of which is hereby incorporated by reference in their entirety into this application.

BACKGROUND

Field

Embodiments relate to a one-component type paint composition with superior scratch resistance.

Description of the Related Art

In car coating industry, a top coat may be composed of a base coat and a clear coat, or a monocoat. A color and clear coating system by which a base coat for serving colors is applied first to a base and then, a clear coat is applied, is a commonly used finishing process for car coating, and the system is required to serve performance enough to withstand various and strict conditions required for cars.

A curing coating system of a resin including a hydroxyl functional group and aminoplast, which has been used as the conventional one-component type thermosetting coating composition, is widely known to provide excellent coating properties but have poor acid resistance due to ether bonds formed through a curing mechanism. As one method for solving such limitation, a coating composition including a curing structure having a carbamate functional group as a main component has been published in the art. Effects obtained from a thermosetting coating composition which introduces a carbamate curing structure include high clearance, high DOI (distinctiveness of image), durability, improved scratch resistance as well as securing properties of flexibility according to the improvement of hardness, and the like.

U.S. Patent Application No. 1994-241925 discloses a paint composition composed of a carbamate acrylic resin/melamine or carbamate melamine/oxyzolidine blocked dodecylbenzyl sulfonic acid (DDBSA) as a catalyst. This paint composition is characterized in being applicable as a one-component type paint composition, and having strong hardness in spite of flexibility and excellent chemical resistance.

U.S. Patent Application No. 1999-378319 discloses a method of preparing a polymer having a carbamate functional group, and discloses methods of preparing a carbamate acryl and carbamate polyester, wherein a carbamate polymer is prepared by reacting a polymer or an oligomer having a hydroxyl functional group with an alkyl carbamate having a low molecular weight.

U.S. Patent Laid-open Publication No. 2003-0009052 discloses a paint composition composed of a carbamate-modified acrylic resin, a carbamate-modified polyester, melamine and a curing agent. Particularly, a carbamate polyester is disclosed as an important constituting component in this patent and is prepared by pre-reacting a lactone and a hydroxyl group and additionally reacting with a carbamate, to be served as a rheology control agent (RCA) for achieving the increasing effect of sagging.

U.S. Patent Laid-open Publication No. 2008-0124532 discloses a paint composition which is a mixture of a polymer or oligomer playing the role of a hard segment having a glass transition temperature of 40° C. or more and a polymer or oligomer playing the role of a soft segment, characterized in that both two kinds of a hard segment polymer and a soft segment polymer utilize carbamate modification.

However, if the aforementioned paint compositions are applied to a one-component type clear paint using a melamine curing agent, the physical properties of a coated and cured film has limitations of inferior elasticity, flexibility, scratch resistance, or scratch restoring properties.

Accordingly, a paint composition securing better physical properties of a coated film and scratch resistance when applied in a one-component type clear paint using a melamine curing agent than the conventional one-component type paint is still required.

SUMMARY

Embodiments of the subject application provide a one-component type paint composition with superior scratch resistance, which includes a carbamate group-containing acrylic polyol resin, a hyperbranched structure carbamate group-containing polyester polyol resin, a curing agent and a curing catalyst, shows excellent acid resistance and scratch resistance, secures excellent scratch restoring properties, and secures excellent elasticity, flexibility and scratch resistance even when applied as a one-component type paint to form a coated film and then cured.

According to at least one embodiment, there is provided a one-component type paint composition with superior scratch resistance, including a resin, a curing agent, a curing catalyst and an organic solvent, wherein the resin includes 30 to 70 wt % of a carbamate group-containing acrylic polyol resin; and 5 to 25 wt % of a hyperbranched structure carbamate group-containing polyester polyol resin based on 100 wt % of the paint composition.

According to another embodiment, there is provided a one-component type paint composition with superior scratch resistance, including a resin, a curing agent, a curing catalyst and an organic solvent, wherein the resin includes 30 to 60 wt % of a carbamate group-containing acrylic polyol resin; 10 to 25 wt % of a hyperbranched structure carbamate group-containing polyester polyol resin; and 5 to 25 wt % of a hydroxyl group-containing long-chain acrylic polyol resin based on 100 wt % of the paint composition.

According to at least one embodiment, the one-component type paint composition with superior scratch resistance has equivalent or better acid resistance and scratch resistance when compared to the conventional one-component type paint, secures excellent scratch restoring performance in spite of using a melamine curing agent, and secures excellent elasticity, flexibility and scratch resistance even when applied as a one-component type paint to form a coated film and then cured.

DETAILED DESCRIPTION

Hereinafter, the various embodiments will be described in more detail.

According to at least one embodiment, there is provided a one-component type paint composition with superior scratch resistance, including a resin, a curing agent, a curing catalyst and an organic solvent, wherein the resin includes 30 to 70 wt % of a carbamate group-containing acrylic polyol resin; and 5 to 25 wt % of a hyperbranched structure carbamate group-containing polyester polyol resin based on 100 wt % of the paint composition.

The paint composition according to at least one embodiment may have a solid content of 50 to 70 wt % and a viscosity of 20 to 40 seconds based on Ford cup #4. The viscosity is in a range for achieving appropriate coating workability. If the viscosity is less than 20 seconds, defects including a perpendicular plane flow may arise, and if the viscosity is greater than 40 seconds, a coater may be loaded, that may cause the failure of the coater, and the appearance of a coated film may be deteriorated due to the high viscosity.

The carbamate group-containing acrylic polyol resin used in the paint composition according to at least one embodiment may have a solid content of 50 to 80 wt % and a carbamate equivalent of 400 to 700 based on the solid content. In addition, the carbamate group-containing acrylic polyol resin may have a weight average molecular weight of 3,000 to 10,000, a glass transition temperature of −30 to 30° C., and a hydroxyl value of 30 to 70 mgKOH based on the solid content. If the carbamate group-containing acrylic polyol resin satisfies the ranges of the equivalent and the hydroxyl value, appropriate mechanical properties may be obtained during applying to a coated film. The carbamate group-containing acrylic polyol resin may be prepared by using an organic solvent, a radical polymerization initiator, an ethylenically unsaturated monomer, a non-functional acrylic monomer, a hydroxyl group-containing acrylic monomer, an alkyl carbamate and a tin-based catalyst, without specific limitation.

The ethylenically unsaturated monomer may include styrene and its derivatives, butadiene, and acrylic or methacrylic acid ester of C1 to C12 alkyl, but is not limited thereto.

According to at least one embodiment, the non-functional acrylic monomer may include methyl methacrylate, ethyl methacrylate, isobutyl methacrylate, n-butyl methacrylate, tert-butyl methacrylate, n-hexyl methacrylate, 2-ethylhexyl methacrylate, isobornyl methacrylate, cyclohexyl methacrylate, methyl acrylate, ethyl acrylate, propyl acrylate, isobutyl acrylate, n-butyl acrylate, tert-butyl acrylate, 2-ethylhexyl acrylate, n-octyl acrylate, isobornyl acrylate, cyclohexyl acrylate, and the like.

According to at least one embodiment, the hydroxyl group-containing monomer may include 2-hydroxyethyl methacrylate, hydroxyethyl methacrylate, 2-hydroxypropyl methacrylate, 2-hydroxyethyl acrylate, 2-hydroxypropyl acrylate, kadura acrylate, kadura methacrylate, caprolactone acrylate, caprolactone methacrylate, 2,3-dihydroxypropyl acrylate, 2,3-dihydroxypropyl methacrylate, polypropylene-modified acrylate, polypropylene-modified methacrylate, 4-hydroxymethylcyclohexyl-methyl acrylate, 4-hydroxymethylcyclo-methyl methacrylate, 2,2,4-trimethyl-1,3-pentanediol monoacrylate, 2,2,4-trimethyl-1,3-pentanediol monomethacrylate, isobornyl acrylate, isobornyl metharcrylate, and the like.

The paint composition according to at least one embodiment includes a carbamate group-containing acrylic polyol resin in an amount of 30 to 70 wt %, for example, 35 to 65 wt %, for example, 40 to 60 wt % based on total 100 wt % of the composition. If the amount of the carbamate group-containing acrylic polyol resin is too small, defects of impeding chemical properties such as chemical resistance may arise, and if the amount is too large, defects such that cold chipping resistance is deteriorated and a coated film becomes too hard, may arise. In addition, if the amount of the carbamate-containing acrylic polyol resin deviates from the aforementioned range, mechanical properties and workability during preparing and coating may be degraded.

The paint composition according to at least one embodiment includes a hyperbranched structure carbamate group-containing polyester polyol resin. The hyperbranched structure carbamate group-containing polyester polyol resin according to at least one embodiment means a bonded one of a polyester resin containing three or more carbamate groups to an isocyanate compound via a branch structure.

The hyperbranched structure carbamate group-containing polyester polyol resin used in the paint composition according to at least one embodiment may have a solid content of 50 to 80 wt % and the carbamate equivalent of 500 to 800 based on the solid content. In addition, the hyperbranched structure carbamate group-containing polyester polyol resin may have a weight average molecular weight of 5,000 to 20,000 and a hydroxyl value of 30 to 70 mgKOH based on the solid content.

It is not specifically limited, but the hyperbranched structure carbamate group-containing polyester polyol resin may be prepared using an organic solvent, a polyhydric alcohol, polybasic acid, an alkyl carbamate, a tin-based catalyst, and an isocyanate compound.

The polyhydric alcohol includes glycols, diols, triols, tetraols, and the like. In an embodiment, the polyhydric alcohol may be selected from ethylene glycol, diethylene glycol, triethylene glycol, propylene glycol, 1,4-butanediol, 2,3-butanediol, 1,6-hexanediol, dimethylene glycol, trimethylolpropane, neopentyl glycol, and the like.

The polyhydric acid may include maleic anhydride, fumaric acid, citraconic acid phthalic anhydride, tetrahydrophthalic anhydride, isophthalic acid, terephthalic acid, hexahydrophthalic acid, adipic acid, sebacic acid, azelaic acid, anhydrides thereof, or the like.

The isocyanate compound may be selected from isocyanate monomers such as toluene diisocyanate, hexamethylene diisocyanate, methylene diphenyl diisocyanate, and methylene bis(4-cyclohexylisocyanate), and the dimmers or the trimers of the monomers.

The paint composition according to at least one embodiment may include the hyperbranched structure carbamate group-containing polyester polyol resin in an amount of 5 to 25 wt %, for example, 8 to 22 wt %, for example 12 to 18 wt % based on total 100 wt % of the composition. If the amount of the hyperbranched structure carbamate group-containing polyester polyol resin is too small, it is difficult to achieve excellent elasticity, flexibility, and scratch resistance of a coated film, and if the amount is too large, it is difficult to secure the hardness of a coated film.

The curing agent used in the paint composition according to at least one embodiment may use a melamine compound, and may be selected from the group consisting of, for example, hexamethylol melamine, hexamethoxymethyl melamine, hexabutoxymethyl melamine, and a combination thereof.

The paint composition according to at least one embodiment may include the curing agent in an amount of 6 to 25 wt %, for example, 8 to 22 wt %, for example, 12 to 18 wt % based on total 100 wt % of the composition. If the amount of the curing agent is less than 6 wt %, hardness, solvent resistance, or the like may be adversely affected due to incomplete curing during the reaction of the curing agent and a main resin, and if the amount is greater than 25 wt %, physical properties of a coated film such as adhesiveness and impact resistance may be adversely affected due to over-curing, and an unreacted melamine compound may remain in a coated film to adversely affect other physical properties.

The curing catalyst used in the paint composition according to at least one embodiment may be selected from the group consisting of dodecylbenzenesulfonic acid, sulfonic acid, dinonylnaphthalene disulfonic acid, dinonylnaphthalene sulfonic acid, and a combination thereof.

The paint composition according to at least one embodiment may include the curing catalyst in an amount of 0.1 to 5 wt %, for example, 0.3 to 3 wt %, for example, 0.5 to 2 wt % based on total 100 wt % of the composition. If the amount deviates from the aforementioned range, mechanical properties may decrease due to incomplete curing.

The organic solvent used in the paint composition according to at least one embodiment is not specifically limited, and may be selected from the group consisting of, for example, KOKOSOL #100, butanol, 1-methoxy-2-propyl acetate, ethyl ethoxypropionate, and a mixture thereof. The paint composition according to at least one embodiment may include the organic solvent in an amount of 5 to 30 wt %, for example, 10 to 27 wt %, for example, 15 to 23 wt % based on total 100 wt % of the composition. If the amount deviates from the aforementioned range, the workability during pre-paring coating may be degraded.

The paint composition according to at least one embodiment may further include one or more additives selected from the group consisting of a surface-adjusting agent, a light stabilizer, a weather resistance additive, an appearance control agent, an anti-foaming agent and a leveling agent. It is not particularly limited, but the paint composition according to at least one embodiment may include the additive in an amount of 0.01 to 20 wt % based on total 100 wt % of the composition.

According to another embodiment, there is provided a one-component type paint composition with superior scratch resistance, including a resin, a curing agent, a curing catalyst and an organic solvent, wherein the resin includes 30 to 60 wt % of a carbamate group-containing acrylic polyol resin; 10 to 25 wt % of a hyperbranched structure carbamate group-containing polyester polyol resin; and 5 to 25 wt % of a hydroxyl group-containing long-chain acrylic polyol resin, based on 100 wt % of the paint composition.

The paint composition according to another embodiment has a solid content of 50 to 70 wt % and a viscosity of 20 to 40 seconds based on a Ford cup #4. The viscosity is in a range for achieving suitable coating workability. If the viscosity is less than 20 seconds, defects such as perpendicular plane flow may arise and if the viscosity is greater than 40 seconds, a coater may be loaded, that may cause the failure of the coater, and the appearance of a coated film may be impeded due to the high viscosity.

The carbamate group-containing acrylic polyol resin, the hyperbranched structure carbamate group-containing polyester polyol resin, the curing agent, the curing catalyst and the organic solvent used in the paint composition according to another embodiment may use the same components in the paint composition according to at least one embodiment.

The paint composition according to another embodiment includes the carbamate group-containing acrylic polyol resin in an amount of 30 to 60 wt %, for example, 30 to 55 wt %, for example, 30 to 50 wt % based on total 100 wt % of the composition. If the amount of the carbamate group-containing acrylic polyol resin is too small, chemical properties such as chemical resistance may be inhibited, and if the amount is too large, cold chipping resistance may be deteriorated and a coated film may become too hard. In addition, if the amount of the carbamate group-containing acrylic polyol resin deviated from the aforementioned range, mechanical properties and workability during preparing and coating may be degraded.

The paint composition according to another embodiment may include the hyperbranched structure carbamate group-containing polyester polyol resin in an amount of 10 to 25 wt %, for example 12 to 20 wt %, for example, 13 to 18 wt % based on total 100 wt % of the composition. If the amount of the hyperbranched structure carbamate group-containing polyester polyol resin is too small, it is difficult to achieve good elasticity, flexibility and scratch resistance of a coated film, and if the amount is too large, it is difficult to secure the hardness of a coated film.

The hydroxyl group-containing long-chain acrylic polyol resin used in the paint composition according to another embodiment may have a solid content of 50 to 80 wt % and a hydroxyl value of 80 to 170 mgKOH based on the solid content. In addition, the hydroxyl group-containing long-chain acrylic polyol resin may have a weight average molecular weight of 10,000 to 30,000, and a glass transition temperature of −50 to 0° C.

It is not specifically limited, but the hydroxyl group-containing long-chain acrylic polyol resin is polymerized using an acid group-containing acrylic monomer or an acid group-containing methacrylic monomer, a non-functional acrylic monomer and a hydroxyl group-containing long-chain acrylic monomer, and the hydroxyl group-containing long-chain acrylic monomer may have a structure below. It is not specifically limited, but the long-chain acrylic monomer may have 2 or more (for example, 2 to 30, for example, 2 to 20) carbon atoms. The hydroxyl group-containing long-chain acrylic polyol resin may be prepared by adding an ethylenically unsaturated monomer according to circumstances.

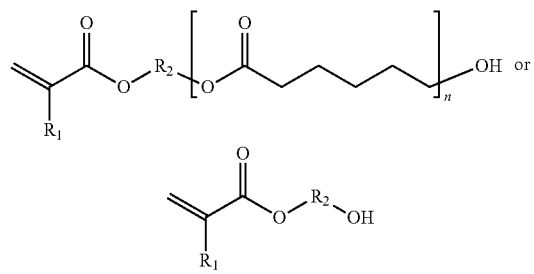

Wherein, $R_1$ is H or $CH_3$, $R_2$ is alkyl having 2 or more (for example, 2 to 30, for example, 2 to 20) carbon atoms or cycloalkyl, and n is an integer of 1 or more (for example, 1 to 5).

The paint composition according to another embodiment may include the hydroxyl group-containing long-chain acrylic polyol resin in an amount of 5 to 25 wt %, for example, 7 to 23 wt %, for example, 9 to 21 wt % based on total 100 wt % of the composition. If the amount of the hydroxyl group-containing long-chain acrylic polyol resin is too small, it is difficult to achieve good elasticity, flexibility and scratch resistance of a coated film, and if the amount is too large, it is difficult to secure the hardness of the coated film.

The resin prepared according to another embodiment has the ester structure of a long-chain and thus, has excellent elasticity, flexibility and scratch resistance.

The paint composition according to another embodiment may include the curing agent in an amount of 6 to 25 wt %, for example 8 to 22 wt %, for example, 12 to 18 wt % based on total 100 wt % of the composition. If the amount of the curing agent is less than 6 wt %, hardness, solvent resistance, or the like may be adversely affected due to incomplete curing during the reaction of the curing agent and a main resin, and if the amount is greater than 25 wt %, physical properties of a coated film such as adhesiveness and impact resistance may be adversely affected due to overcuring, and an unreacted melamine compound may remain in a coated film to adversely affect other physical properties.

The paint composition according to another embodiment may include the curing catalyst in an amount of 0.1 to 5 wt %, for example, 0.3 to 3 wt %, for example, 0.5 to 2 wt % based on total 100 wt % of the composition. If the amount deviates from the aforementioned range, mechanical properties may decrease due to incomplete curing.

The organic solvent used in the paint composition according to another embodiment is not specifically limited, and may be selected from the group consisting of, for example, KOKOSOL #100, butanol, 1-methoxy-2-propyl acetate, ethyl ethoxypropionate, and a mixture thereof. The paint composition according to another embodiment may include the organic solvent in an amount of 5 to 30 wt %, for example, 10 to 27 wt %, for example, 15 to 23 wt % based on total 100 wt % of the composition. If the amount deviates from the aforementioned range, the workability of preparing and coating may be degraded.

The paint composition according to another embodiment may further include one or more additives selected from the group consisting of a surface-adjusting agent, a light stabilizer, a weather resistance additive, an appearance control agent, an anti-foaming agent and a leveling agent. It is not specifically limited, but the paint composition according to another embodiment may include the additive in an amount of 0.01 to 20 wt % based on total 100 wt % of the composition.

Hereinafter, the various embodiments will be explained in more detail referring to embodiments. However, these embodiments are only intended to assist the understanding of the subject application and the scope of the various embodiments is not limited thereto.

EXAMPLES

Examples 1-1 to 1-3 and Comparative Examples 1-1 to 1-5

1. Synthetic Example 1: Preparation of Carbamate Group-Containing Acrylic Polyol Resin (A)

To a four-neck flask equipped with a thermometer, a stirrer, a condenser and a heating apparatus, 215 parts by weight of KOKOSOL #100 was injected and the temperature was elevated to the refluxing temperature (165° C.). After the refluxing was stabilized, 206 parts by weight of 2-hydroxyethyl acrylate, 190 parts by weight of a styrene monomer, 100 parts by weight of n-butyl acrylate, 40 parts by weight of an alpha-methylstyrene dimer were uniformly mixed, and 15 parts by weight of tert-butyl peroxybenzoate and 40 parts by weight of KOKOSOL #100 were separately uniformly mixed. Then, the mixtures were uniformly and separately added dropwisely over 180 minutes and 195 minutes, respectively, followed by maintaining refluxing for 60 minutes. After finishing the maintenance, the reaction product was diluted with KOKOSOL #100 and cooled to 80° C. Then, 80 parts by weight of methyl carbamate and 1.3 parts by weight of dibutyltin oxide were added thereto, and methanol flown at about 145° C. was separately collected. After collecting about 30 parts by weight of methanol, nitrogen was injected to remove remaining methyl carbamate for 1 hour and the resultant product was cooled to finish the reaction. Through this, obtained was a carbamate group-containing acrylic polyol resin having a solid content of 63%, a viscosity of Z2, a hydroxyl value of 50 mgKOH, a weight average molecular weight of 5,000, a glass transition temperature of 10° C., and a carbamate equivalent of 600 based on the solid content.

2. Comparative Synthetic Example 1: Preparation of Acrylic Polyol Resin (B)

To a four-neck flask for synthesis, equipped with a thermometer and a stirrer, 215 parts by weight of KOKOSOL #100 was injected and the temperature was elevated to the refluxing temperature (165° C.). After the refluxing was stabilized, 203 parts by weight of hydroxypropyl acrylate, 152 parts by weight of a styrene monomer, 132 parts by weight of n-butyl methacrylate and 127 parts by weight of n-butyl acrylate, and 10 parts by weight of tert-butyl peroxybenzoate and 52 parts by weight of KOKOSOL #100 were uniformly separately added dropwisely over 180 minutes and 195 minutes, respectively, followed by maintaining refluxing for 60 minutes. The reaction product was diluted with KOKOSOL #100 and cooled to 60° C. to obtain an acrylic polyol resin with a solid content of 70%.

3. Synthetic Example 2: Preparation of Hyperbranched Structure Carbamate Group-Containing Polyester Polyol Resin (C)

To a four-neck flask equipped with a thermometer, a stirrer, a condenser, a packed column and a heating apparatus, 90 parts by weight of trimethylolpropane, 250 parts by weight of neopentyl glycol, 380 parts by weight of hexahydrophthalic anhydride, and 0.5 parts by weight of dibutyltin oxide were injected and the temperature was slowly elevated. After the injected compounds were dissolved, the reactants were stirred and the temperature was slowly elevated to 230° C. while removing water produced from the condensation reaction. The reaction was maintained at 230° C. until an acid value reached 10, and when the acid value reached 10 or less, the reaction product was cooled to 80° C. 90 parts by weight of methyl carbamate was injected thereto, and the temperature was slowly elevated to 145° C. Methanol produced from the condensation reaction was removed and when the hydroxyl value reached 60 or less, the resultant product was cooled to 60° C. 80 parts by weight of KOKOSOL #100, 70 parts by weight of ethoxyethyl propionate and 55 parts by weight of a hexamethylene diisocyanate trimer (Desmudur N-3300) were injected at 60° C., and this temperature was maintained until NCO % reached 0.05% or less. After finishing the maintenance, the resultant product was diluted with KOKOSOL #100, and the reaction was finished. Through this, obtained was a hyperbranched structure carbamate group-containing polyester polyol resin having the physical properties of a solid content of 70%, a carbamate equivalent of 700 based on the solid content, a weight average molecular weight of 12,000, a viscosity of Z3, and a hydroxyl value of 55.

4. Comparative Synthetic Example 2: Preparation of Carbamate Group-Containing Polyester Polyol Resin (D)

To a four-neck flask for synthesis, equipped with a thermometer, a stirrer, a condenser, a packed column and a heating apparatus, 90 parts by weight of trimethylolpropane, 250 parts by weight of neopentyl glycol, 380 parts by weight of hexahydrophthalic anhydride, and 0.5 parts by weight of dibutyltin oxide were injected and the temperature was slowly elevated to 165° C. After the injected compounds were dissolved, the reactants were stirred and the temperature was slowly elevated to 230° C. while removing water produced from the condensation reaction. The reaction was maintained at 230° C. until an acid value reached 10, and when the acid value reached 10 or less, the reaction product was cooled to 80° C. The reaction product was diluted with KOKOSOL #100, and the reaction was finished. Then, a resin having the physical properties of a solid content of 70%, a viscosity of Y and a hydroxyl value of 157 was obtained.

5. Preparation of Paint Composition

Paint compositions of Examples 1-1 to 1-3 and Comparative Examples 1-1 to 1-5 were respectively prepared using the compositions shown in Table 1 below and stirring and mixing for 20 minutes or more in 1,500 rpm. Then the paint compositions were applied under the conditions written below, and the physical properties thus measured are shown in Table 2.

Paint Coating Conditions
① Handgun spray
② Nozzle diameter: 1.5 mm, air pressure: kept constant at around 4.5 kgf/cm²
③ Coating was performed by moving at a constant speed of 40-50 cm/sec in the horizontal direction while maintaining the distance from a nozzle inlet to a specimen in a range of 2-30 cm.
④ After coating and curing by baking at 130° C. for 20 minutes, the physical properties of a coated film (hardness, adhesiveness, water resistance, acid resistance, alkali resistance, solvent resistance, etc.) were measured.

Measurement Method of Physical Properties
(1) Hardness
Measurement method: measured by a pencil hardness method (hardness which does not damage the coated film by using each pencil of 3B, 2B, B, HB, F, H, 2H and 3H was measured)
(3B, 2B, B, HB, F, H, 2H, 3H: inferior⇔excellent)
(2) Adhesiveness
Measurement method: a specimen to which up to a top coat process was finished was subjected to a heat treatment cycle and then, stood for 24 hours, and the adhesive strength was measured by a method using a baduk board-shaped region checkered with a distance of 0.2 mm.
Heat treatment cycle: heated at 150° C.×20 minutes and then, allowed to stand at room temperature for 20 minutes, repeating this process three times
(M-1, M-2, M-3, M-4, M-5: excellent⇔inferior)
(3) Water Resistance
Measurement method: a specimen was immersed in a constant temperature water bath at 40° C. for 240 hours and stood therein at room temperature for 1 hour, and a tape peeling test was performed for evaluating adhesiveness using a using a baduk board-shaped region checkered with a distance of 0.2 mm. The specimen was observed with the naked eye for any abnormalities in appearance.

TABLE 1

(amount: parts by weight)

| Component | Comparative Example 1-1 | Comparative Example 1-2 | Comparative Example 1-3 | Comparative Example 1-4 | Comparative Example 1-5 | Example 1-1 | Example 1-2 | Example 1-1 |
|---|---|---|---|---|---|---|---|---|
| Resin A | 65 | | 50 | 25 | 63 | 50 | 45 | 60 |
| Resin B | | 60 | | | | | | |
| Resin C | | | | 40 | 2 | 15 | 20 | 5 |
| Resin D | | | 15 | | | | | |
| Curing agent | 15 | 15 | 15 | 15 | 15 | 15 | 15 | 15 |
| Curing catalyst | 1 | 1 | 1 | 1 | 1 | 1 | 1 | 1 |
| Surface-adjusting agent | 0.2 | 0.2 | 0.2 | 0.2 | 0.2 | 0.2 | 0.2 | 0.2 |
| Light stabilizer | 0.5 | 0.5 | 0.5 | 0.5 | 0.5 | 0.5 | 0.5 | 0.5 |
| UV absorber | 1.1 | 1.1 | 1.1 | 1.1 | 1.1 | 1.1 | 1.1 | 1.1 |
| KOKOSOL #100 | 10.7 | 15.7 | 12.2 | 10.7 | 10.7 | 12.2 | 12.2 | 10.7 |
| Butanol | 6.5 | 6.5 | 5 | 6.5 | 6.5 | 5 | 6.5 | 6.5 |
| Sum | 100 | 100 | 100 | 100 | 100 | 100 | 100 | 100 |

Curing agent: alkylated melamine (Cymel 1161)
Curing catalyst: dodecylbenzenesulfonic acid (Nacure XP 221)
Surface-adjusting agent: silicone surfactant (BYK-331 10% sol'n)
Light stabilizer: hindered amine light stabilizer (Tinuvin 123)
UV absorber: Tinuvin 384

Determination method: after finishing the test, on the appearance, softening, whitening, gloss defect, peeling, swelling, discoloration, etc. were not required to be observed, no appearance difference between an immersed part and a non-immersed part was required to be observed, and the total peeled area after the adhesiveness evaluation was required to be less than 5%.

(M-1, M-2, M-3, M-4, M-5: excellent⇔inferior)

(4) Acid Resistance

Measurement method: 0.1 N sulfuric acid was dropped in drops by 0.2 mL onto a specimen and the specimen was heated for 150 minutes by setting the temperature of a gradient oven to 35-40° C.

Determination method: the occurrence of etching, stains, blisters of the specimen onto which the sulfuric acid solution was dropped, was verified with the naked eye, and the maximum temperature generating no damage was determined to the acid resistant temperature.

(5) Scratch Resistance

Measurement method: reciprocation was performed ten times using an Amtec Kistler equipment.

Determination method: the initial 20 degree gloss of a specimen was measured and then, reciprocation was performed ten times and 20 degree gloss was measured. The gloss before the measurement was divided by the gloss after the measurement to calculate gloss retention.

(6) Solvent Resistance

Measurement method: after putting a cotton swab moistened with a test solvent (xylene) on a specimen, the specimen was scratched four times with 2 Kg force using the nail every one minute and the time at which the surface of a coated layer underneath was appeared, was recorded.

scratch resistance of the various embodiments were used, improved elasticity and flexibility were achieved due to the superior scratch resistance.

Examples 2-1 and 2-2 and Comparative Examples 2-1 to 2-7

Resins were prepared by the same method as in Synthetic Examples 1 and 2 and Comparative Synthetic Example 1, and a hydroxyl group-containing long-chain acrylic polyol resin (D) was prepared as follows.

1. Synthetic Example 3: Preparation of Hydroxyl Group-Containing Long-Chain Acrylic Polyol Resin (D)

To a four-neck flask for synthesis, equipped with a thermometer and a stirrer, 66 parts by weight of butyl acetate was injected, and the temperature was elevated to the refluxing temperature (about 130° C.). After the refluxing was stabilized, 141 parts by weight of Miramer M100 (caprolactone acrylate, Miwon Co.), 39 parts by weight of methylmethacrylate and 2 parts by weight of methacrylic acid were uniformly mixed, and 7 parts by weight of benzoyl peroxide and 7 parts by weight of butyl acetate were uniformly mixed. The mixtures were uniformly and separately added thereto dropwisely over 300 minutes, followed by maintaining refluxing for 60 minutes. The reaction product was diluted with butyl acetate and cooled to 60° C. to obtain a hydroxyl group-containing long-chain acrylic polyol resin having a solid content of 63%, a hydroxyl value of 130 mgKOH based on the solid content, a weight average molecular weight of 22,000 and a glass transition temperature of −30° C.

TABLE 2

| | Comparative Example | | | | | Example | | |
|---|---|---|---|---|---|---|---|---|
| Category | 1-1 | 1-2 | 1-3 | 1-4 | 1-5 | 1-1 | 1-2 | 1-3 |
| Hardness | F | B | HB | HB | HB | F | HB | F |
| Adhesiveness | M-1 | M-1 | M-1 | M-1 | M-1 | M-1 | M-3 | M-1 |
| Water resistance | M-1 | M-1 | M-1 | M-1 | M-1 | M-1 | M-1 | M-1 |
| Acid resistance | 43° C.↑ | 39° C.↑ | 43° C.↑ | 43° C.↑ | 43° C.↑ | 43° C.↑ | 43° C.↑ | 43° C.↑ |
| Scratch resistance | 54% | 48% | 59% | 59% | 59% | 64% | 64% | 61% |
| Solvent resistance | 10 min or more | 7 min | 10 min or more | 7 min | 7 min | 10 min or more | 10 min or more | 10 min or more |

As shown in Table 2, Examples 1-1 and 1-3, which are one-component type paint compositions with superior scratch resistance according to various embodiments, had equivalent or better physical properties such as hardness, adhesiveness, water resistance and acid resistance than Comparative Examples 1-1 to 1-3, and showed even better effects on elasticity, flexibility, scratch resistance and solvent resistance than Comparative Examples 1-1 to 1-5. That is, if the one-component type paint compositions with superior 2. Preparation of Paint Composition Paint compositions of Examples 2-1 and 2-2 and Comparative Examples 2-1 to 2-7 were respectively prepared using the components shown in Table 3 below and stirring and mixing for 20 minutes or more in 1,500 rpm. Coating was performed by the conditions shown below, and the physical properties measured thereafter are shown in Table 4.

TABLE 3

(amount: parts by weight)

| Component | Comparative Example 2-1 | Comparative Example 2-2 | Comparative Example 2-3 | Comparative Example 2-4 | Comparative Example 2-5 | Comparative Example 2-6 | Comparative Example 2-7 | Example 2-1 | Example 2-2 |
|---|---|---|---|---|---|---|---|---|---|
| Resin A | 65 | | 50 | 60 | 40 | 49 | 20 | 40 | 30 |
| Resin B | | 50 | | | | | | | |
| Resin C | | | 15 | 15 | 5 | 25 | 15 | 15 | 15 |
| Resin D | | | | | | | 1 | 30 | 10 | 20 |
| Curing agent | 15 | 15 | 15 | 15 | 15 | 15 | 15 | 15 | 15 |
| Curing catalyst | 1 | 1 | 1 | 1 | 1 | 1 | 1 | 1 | 1 |
| Surface-adjusting agent | 0.2 | 0.2 | 0.2 | 0.2 | 0.2 | 0.2 | 0.2 | 0.2 | 0.2 |
| Light stabilizer | 0.5 | 0.5 | 0.5 | 0.5 | 0.5 | 0.5 | 0.5 | 0.5 | 0.5 |
| UV absorber | 1.1 | 1.1 | 1.1 | 1.1 | 1.1 | 1.1 | 1.1 | 1.1 | 1.1 |
| KOKOSOL #100 | 10.7 | 10.7 | 10.7 | 10.7 | 10.7 | 10.7 | 10.7 | 12.2 | 12.2 |
| Butanol | 6.5 | 6.5 | 6.5 | 6.5 | 6.5 | 6.5 | 6.5 | 5 | 5 |
| Sum | 100 | 100 | 100 | 100 | 100 | 100 | 100 | 100 | 100 |

The same curing agent, curing catalyst, surface-adjusting agent, light stabilizer and UV absorber as those in the above Table 1 were used, the paint coating conditions were the same as those of Example 1-1, and the same method as in Example 1 were applied except for measuring a gloss restoring ratio instead of solvent resistance in the measurement of physical properties as follows.

(1) Gloss Restoring Ratio

Measurement method: the specimen for testing scratch resistance was stood at 40° C. for 1 hour, and the gloss was remeasured. The increment of the gloss evaluated for scratch resistance was divided by the gloss before measurement, and the resultant value was expressed as the gloss restoring ratio.

TABLE 4

| Category | Comparative Example 2-1 | Comparative Example 2-2 | Comparative Example 2-3 | Comparative Example 2-4 | Comparative Example 2-5 | Comparative Example 2-6 | Comparative Example 2-7 | Example 2-1 | Example 2-2 |
|---|---|---|---|---|---|---|---|---|---|
| Hardness | F | B | F | F | HB | HB | B | F | B |
| Adhesiveness | M-1 | M-1 | M-1 | M-1 | M-3 | M-1 | M-1 | M-1 | M-1 |
| Water resistance | M-1 | M-1 | M-1 | M-1 | M-1 | M-1 | M-1 | M-1 | M-1 |
| Acid resistance | 43° C. | 41° C. | 43° C. | 43° C. | 43° C. | 43° C. | 40° C. | 43° C. | 43° C. |
| Scratch resistance | 54% | 51% | 64% | 61% | 64% | 64% | 58% | 64% | 64% |
| Gloss restoring ratio | 0.5% | 1% | 1% | 0.5% | 1% | 1% | 3% | 8% | 6% |

As shown in Table 4, Examples 2-1 and 2-2, which were one-component type paint compositions with superior scratch resistance of various embodiments, showed equivalent or better physical properties such as hardness, adhesiveness, water resistance and acid resistance than Comparative Examples 2-1 to 2-7, and even better scratch resistance and gloss restoring ratio than Comparative Examples 2-1 to 2-7. That is, if the one-component type paint compositions according to various embodiments with superior scratch resistance were used, excellent scratch restoring performance was found to be secured even when curing a coated film without using an isocyanate curing agent or oligomer.

The invention claimed is:

1. A one-component type paint composition with superior scratch resistance, comprising a resin, a curing agent, a curing catalyst and an organic solvent, wherein the resin comprises:
   30 to 70 wt % of a carbamate group-containing acrylic polyol resin; and
   5 to 25 wt % of a hyperbranched structure carbamate group-containing polyester polyol resin, based on 100 wt % of the paint composition,
   wherein the hyperbranched structure carbamate group-containing polyester polyol resin a bonded one of a polyester resin containing three or more carbamate groups to an isocyanate compound via a branch structure.

2. The one-component type paint composition with superior scratch resistance of claim 1, wherein the resin comprises:
   30 to 60 wt % of the carbamate group-containing acrylic polyol resin; and 10 to 25 wt % of the hyperbranched structure carbamate group-containing polyester polyol resin,
and further comprises:
5 to 25 wt % of a hydroxyl group-containing long-chain acrylic polyol resin, based on 100 wt % of the paint composition.

3. The one-component type paint composition with superior scratch resistance of claim 1, wherein the carbamate group-containing acrylic polyol resin has a solid content of 50 to 80 wt % and a carbamate equivalent of 400 to 700 based on the solid content.

4. The one-component type paint composition with superior scratch resistance of claim 1, wherein the hyperbranched structure carbamate group-containing polyester polyol resin has a solid content of 50 to 80 wt % and a carbamate equivalent of 500 to 800 based on the solid content.

5. The one-component type paint composition with superior scratch resistance of claim 1, wherein the one-component type paint composition with superior scratch resistance has a solid content off 50 to 70 wt % and a viscosity of 20 to 40 seconds based on Ford cup #4.

6. The one-component type paint composition with superior scratch resistance of claim 1, wherein the carbamate group-containing acrylic polyol resin has a weight average molecular weight of 3,000 to 10,000, a glass transition temperature of −30 to 30° C., and a hydroxyl value of 30 to 70 mgKOH based on the solid content.

7. The one-component type paint composition with superior scratch resistance of claim 1, wherein the hyperbranched structure carbamate group-containing polyester polyol resin has a weight average molecular weight of 5,000 to 20,000, and a hydroxyl value of 30 to 70 mgKOH based on the solid content.

8. The one-component type paint composition with superior scratch resistance of claim 2, wherein the hydroxyl group-containing long-chain acrylic polyol resin has a solid content of 50 to 80 wt %, and a hydroxyl value of 80 to 170 mgKOH based on the solid content.

9. The one-component type paint composition with superior scratch resistance of claim 2, wherein the hydroxyl group-containing long-chain acrylic polyol resin has a weight average molecular weight of 10,000 to 30,000, and a glass transition temperature of −50 to 0° C.

10. The one-component type paint composition with superior scratch resistance of claim 2, wherein the hydroxyl group-containing long-chain acrylic polyol is polymerized using an acid group-containing acrylic monomer or an acid group-containing methacrylic monomer, a non-functional acrylic monomer and a hydroxyl group-containing long-chain acrylic monomer, and the hydroxyl group-containing long-chain acrylic monomer has the following structure:

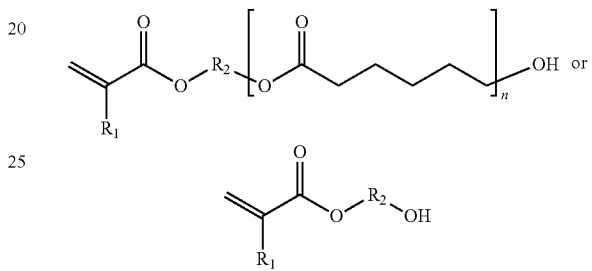

wherein, $R_1$ is H or $CH_3$, $R_2$ is alkyl having 2 or more carbon atoms or cycloalkyl, and n is an integer of 1 or more.

* * * * *